Oct. 12, 1943.  A. H. OELKERS  2,331,797
BRAKE SHOE MOUNTING
Filed March 1, 1941   2 Sheets-Sheet 1
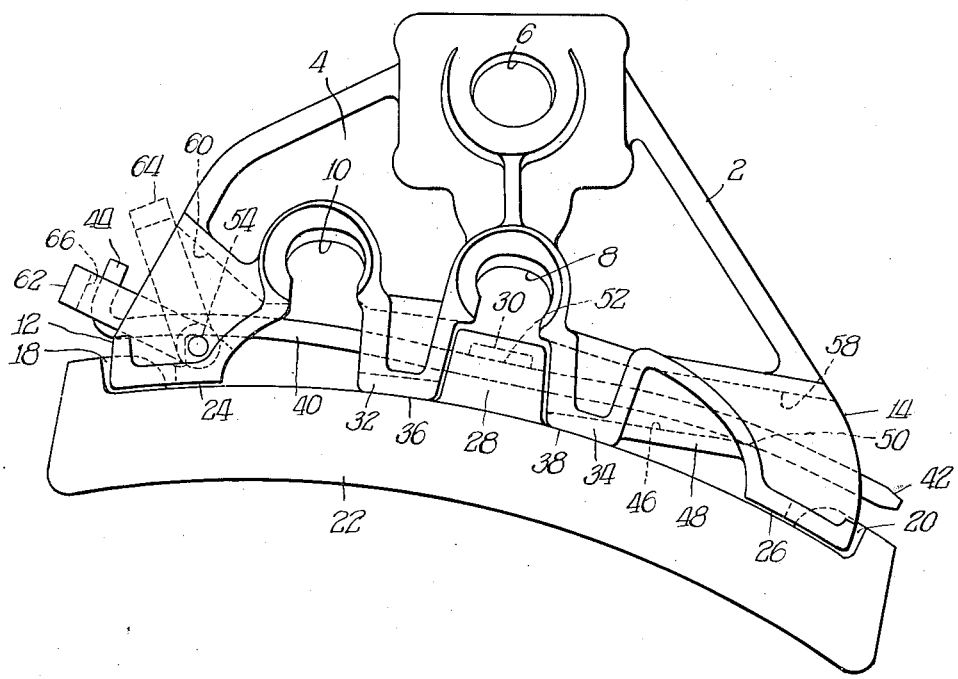
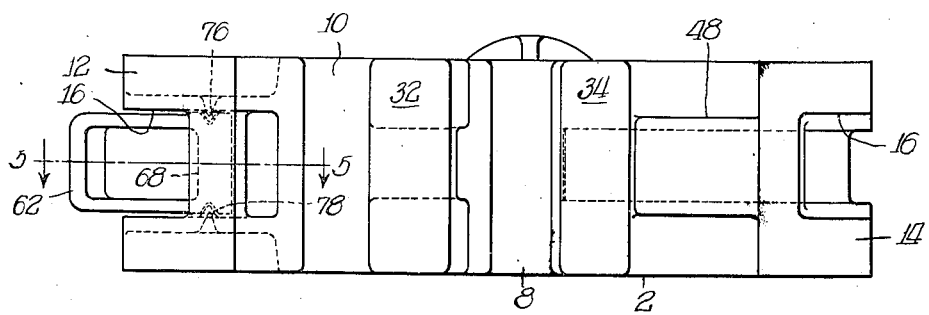
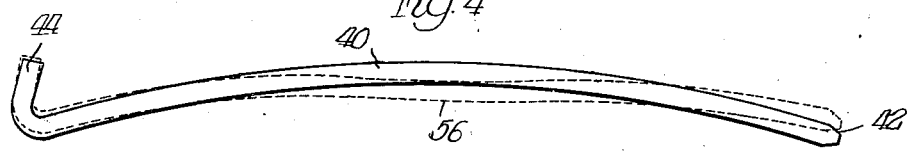
INVENTOR.
Alfred H. Oelkers.

Oct. 12, 1943.   A. H. OELKERS   2,331,797
BRAKE SHOE MOUNTING
Filed March 1, 1941   2 Sheets-Sheet 2
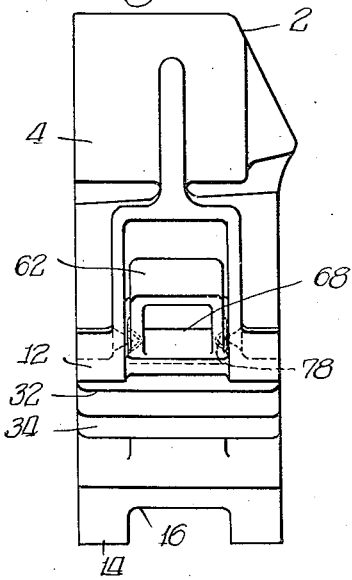
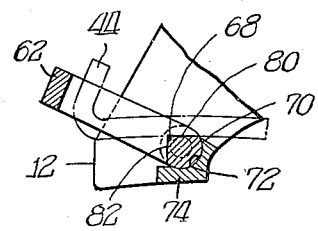
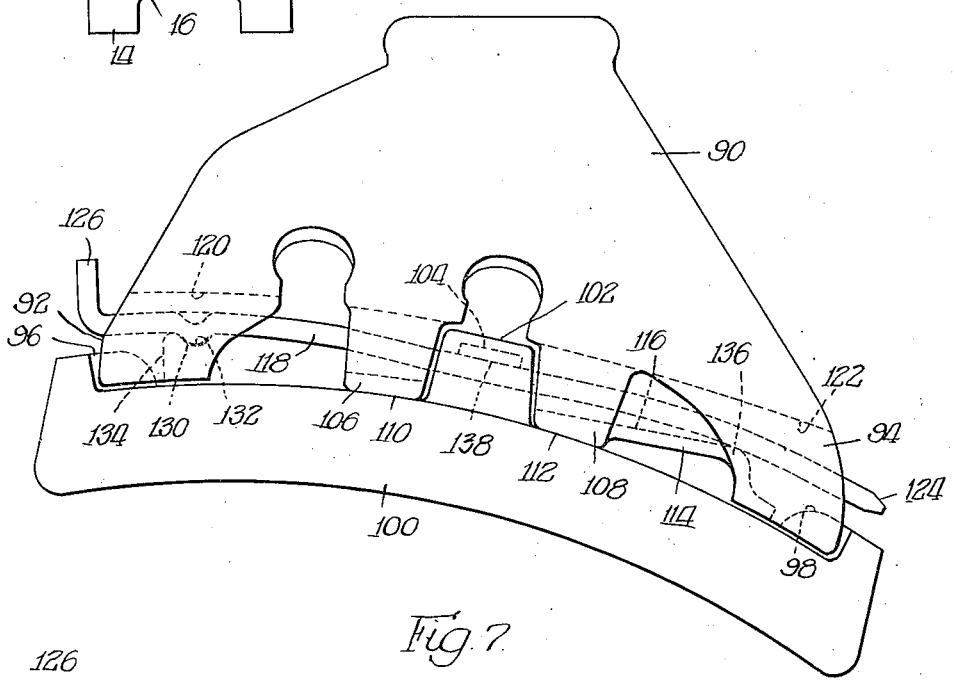
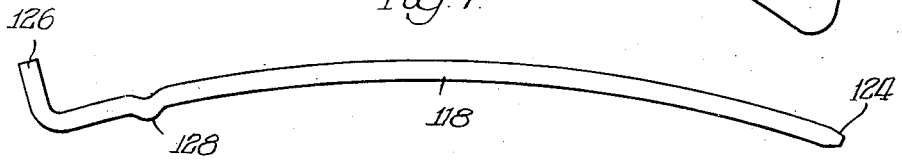
INVENTOR.
Alfred H Oelkers,
BY
ATTY.

Patented Oct. 12, 1943

2,331,797

UNITED STATES PATENT OFFICE 2,331,797

BRAKE SHOE MOUNTING

Alfred H. Oelkers, Chicago, Ill., assignor to American Steel Foundries, Chicago, Ill., a corporation of New Jersey Application March 1, 1941, Serial No. 381,266

9 Claims. (Cl. 188—243)

My invention relates to a brake head and brake shoe assembly and more particularly to a practical and simple attachment for the brake shoe to the brake head.

In a well-known brake shoe connection, a tapered securing member or key is driven as a wedge between spaced lugs on the brake head and an intermediate lug on the brake shoe to afford a tight assembly. My invention comprehends such a connection wherein maximum flexure is afforded for the securing member so that its resilience will readily take up wear between the respective parts and maintain the shoe and head in tight engagement.

My invention includes a brake shoe and brake head arrangement adapted to be secured in tight assembly not only by my novel brake shoe retaining key but also by standard keys utilized on railway brake arrangements.

An object of my invention is to devise a brake head and brake shoe connection wherein the securing member or key has substantially uniform cross section and uniform curvature from end to end.

Another object of my invention is to design a connection between a brake shoe and a brake head wherein a normally arcuate shaped retaining key is flexed so that its central portion is slightly curved in a direction opposite to its normal curvature.

A different object of my invention includes a novel retaining device for the brake shoe securing key to prevent accidental dismantling of the brake head assembly.

A specific object of my invention is to design a brake head and brake shoe connection wherein the securing member engages the brake head adjacent to its opposite ends and a lug on the shoe intermediate its engagement with the brake head, said member being of uniform cross section and curvature so that flexure on each side of said lug is substantially uniform and therefore tightly and evenly holds the brake shoe against said head.

My invention comprehends a brake head and brake shoe assembly wherein the brake head is formed with an inclined or cam surface which extends between an intermediate brake shoe engaging lug and an end lug and which is adapted to flex the securing key as its end is driven up and over the remote edge of said surface during assembly.

Other objects and advantages of my invention will be readily apparent from the following description and the appended claims.

In the drawings,

Figure 1 is a side elevation of a brake head and brake shoe assembly embodying my invention.

Figure 2 is a view toward the brake shoe engaging faces of the brake head shown in Figure 1, the brake shoe being removed.

Figure 3 is an end view taken from the left of the brake head shown in Figure 1 with the brake shoe removed.

Figure 4 is a side elevation of my novel brake shoe retaining key used in the structure shown in Figure 1.

Figure 5 is a fragmentary sectional view taken through a portion of the brake head in Figure 1 and showing my novel key retaining device, the section being taken substantially in the plane indicated by the line 5—5 of Figure 2.

Figure 6 is a side elevation of a brake head and brake shoe assembly embodying a different modification of my invention.

Figure 7 is a side elevation of the brake shoe retaining key used in the assembly shown in Figure 6.

In the modification shown in Figures 1 to 5 inclusive, the brake head 2 may be of substantially conventional construction and comprises the body portion 4 having securing means 6, 8, and 10 affording connection to an associated brake beam and brake hanger (not shown) which support the brake head in operative position adjacent to the tread of an associated wheel (not shown). At opposite ends of the brake head 2 are formed end or toe lugs 12 and 14 which may be bifurcated as at 16, 16 to receive the respective positioning lugs 18 and 20 on the opposite ends of the brake shoe 22. The end lugs 12 and 14 may be afforded clearance from the brake shoe as at 24 and 26 respectively. The brake shoe 22 may be formed of any suitable braking material and is afforded a central lug or boss 28 which includes a tie bar 30 and which is received between the spaced intermediate lugs 32 and 34 on the brake head, said lugs 32 and 34 having abutment with the brake shoe 22 as at 36 and 38 respectively.

Each of the lugs 12, 14, 32 and 34 on the brake head may be apertured in usual manner to afford a slot for the brake shoe securing member or key 40. The key 40 is preferably formed of spring steel and has substantially uniform cross section and uniform curvature from end to end. At one end, the key 40 may be afforded a relatively short taper as at 42, and at the other end the key has a head 44 formed by flanging over the end portion of the key.

In assembly, the end 42 is inserted through the apertures in the lugs 12 and 32 on the brake head and underneath the tie bar 30 so that the tapered end 42 rests upon an inclined surface 46 formed on the diagonally arranged wall 48 which extends between the intermediate lug 34 and the end lug 14. As the key is driven into position the tapered end 42 slides up the inclined surface 46 and is thereby placed under increasing flexure between the end lugs 12 and 14 on the head and the central lug 28 on the shoe. When assembled the tapered end 42 projects slightly outward from the end lug 14. The key bears against the outer edge of wall 48 as at 50 and at its opposite end has abutment as at 54 with the key retaining device 62. The central portion of said key abuts the central lug 28 on the brake shoe and is flexed into curvature reverse from its normal curvature as clearly seen in Figure 1 and indicated by the dotted lines in Figure 4 at 56. It will be apparent to those skilled in the art that the resilient resistance in the key at each side of the central boss 28 is substantially uniform and thus the key securely and tightly holds the brake shoe and brake head in assembly.

The top of the aperture in the end lug 14 may be defined by the top wall 58 disposed in substantially parallel relationship with the diagonally arranged wall 48. The end lug 12 is afforded an outwardly flaring top wall 60, which defines the top of the aperture in said lug, for the purpose of affording space for rotation of the key retaining device 62 to its unlocked position as indicated by the dotted lines at 64.

The key retaining device 62 may be formed as a loop to accommodate at 66 the head 44 on the key to prevent accidental dismantling of the key with the brake shoe and brake head assembly. The inner ends of the loop are joined by a transverse member 68 which is afforded an arcuate surface 70 engaging a complementary surface 72 formed on a tie bar 74 extending between the toes of the lug 12. At opposite ends of the member 68 are formed recesses 76, 76 which accommodate inwardly projecting lugs 78, 78 formed on the adjacent vertical walls of the lug 12 to afford a pivotal connection for the device 62. A flat surface 80 on the member 68 abuts the key 40 as at 54 when it is in locked position and substantially at right angles to said surface 80 is another flat surface 82 over which the key 40 may slide during assembly when the device is in unlocked position.

It is apparent that when the device 62 is rotated to its locked position the engagement at 54 of the flat surface 80 with the key 40 will prevent accidental unlocking of the device because of the pressure which the flexed key exerts on said surface 80 in assembled position.

In the modification shown in Figures 6 and 7 the brake head 90 may be of substantially similar structure as the brake head in the previous modification. The head 90 is afforded end lugs 92 and 94 which are bifurcated to receive the end bosses 96 and 98 on the brake shoe 100. The brake shoe 100 is formed with a central boss 102, which includes a tie bar 104 accommodated between the spaced intermediate lugs 106 and 108, said lugs 106 and 108 abutting as at 110 and 112 respectively the brake shoe 100. Extending between the intermediate lug 108 and the end lug 94 is a diagonally arranged wall 114 presenting an inclined surface 116.

The lugs 92, 106, 108, and 94 on the brake shoe are apertured to receive the brake shoe retaining key 118 and it may be noted that the top of the apertures in the end lugs 92 and 94 are defined by the respective walls 120 and 122 which conform to the general arcuate configuration of the brake head instead of being flared outwardly as in the previous modification.

The key 118 is formed of any suitable resilient metal, preferably spring steel, and has a substantially uniform cross section and uniform curvature from end to end. One end of the key 118 is afforded a short taper as at 124 and the other end may be flanged over to form a head 126. Adjacent to the head 126 the uniform configuration of the key may be interrupted by a lug or offset 128 which, in assembled position, is accommodated as at 130 in a complementary notch 132 formed in the tie bar 134 on the end lug 92.

In assembly, the key 118 is inserted through the apertures in the lugs 92 and 106 and beneath the tie bar 104 so that as the key is driven into position its end 124 will slide up the surface 116 and over the outer edge of wall 114. The boss 128 is snapped into the notch 132 so that the key bears as at 130 and 136 with the respective end lugs 92 and 94 and also bears as at 138 against the tie bar 104 on the central boss 102 of the shoe. It is apparent that in this modification, as well as in the previous one, the central portion of the brake key is flexed to a curvature reverse from its normal curvature by the abutment at 138 with the central boss 102. The relatively wide spacing of the points of abutment of the key with the brake head and the brake shoe permits maximum flexure of the brake key and, therefore, maximum resilience is obtained for affording a tight connection between the brake head and the brake shoe. In this modification, as in the previous one, the key is substantially uniformly flexed between the boss on the shoe and each end lug on the brake head.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a brake assembly, a brake head having apertured end and intermediate spaced lugs, a wall extending between one of said end lugs and one of said intermediate lugs and presenting an inclined surface, a brake shoe having an apertured member received between said intermediate lugs, a securing key extending through said lugs and having an end adapted to slide up said surface and thereby flex said key between said end lugs and said member, said key being of substantially uniform section and curvature from end to end whereby said key is afforded substantially uniform flexure at opposite sides of said member, and retaining means on one of said end lugs rotatable into and out of locking position.

2. In a brake head and brake shoe assembly, the combination of a brake head having end and intermediate spaced lugs, a wall presenting an inclined surface extending between one of said end lugs and one of said intermediate lugs, a brake shoe having a central member accommodated between said intermediate lugs, a securing key of substantially uniform cross section and curvature throughout its length and having one end adapted to slide up said surface to place said key in flexure between said end lugs and said member, and retaining means on said key engaging rotatable means on the adjacent end lug.

3. In a brake head and shoe assembly, the combination of a brake head including end and intermediate spaced lugs, a brake shoe engaging said intermediate lugs and having a member received therebetween, a securing key of uniform cross section and curvature flexed between said end lugs and said member, and retaining means pivoted on one of said end lugs and having a flat surface in complementary engagement with said key to maintain said means in locked position.

4. In a brake head and shoe assembly, the combination of a brake head including end and intermediate spaced lugs, a brake shoe engaging said intermediate lugs and having a member received therebetween, a securing key for said head and said shoe flexed between said end lugs and said member, and retaining means for said key comprising a member embracing the adjacent end thereof to limit possible longitudinal movement of said key in one direction.

5. In a brake head and shoe assembly, the combination of a brake head including end and intermediate spaced lugs, a brake shoe engaging said intermediate lugs and having a member received therebetween, a securing key of substantially uniform cross section and curvature throughout its length flexed between said end lugs and said member, and means on said key engaging rotatable means on one of said end lugs.

6. In a brake head and shoe assembly, the combination of a brake head including end and intermediate spaced lugs, a brake shoe engaging said intermediate lugs and having a member received therebetween, a securing key for said head and said shoe flexed between said end lugs and said member, and rotatable retaining means for said key on one of said end lugs to prevent accidental dismantling of said assembly.

7. In a brake head, end and intermediate lugs having a key passage therethrough, and a member for engagement with an associated shoe retaining key to maintain the same in assembly within said passage, said member being partially housed within one of said end lugs and pivoted thereto, whereby said member may be rotated into and out of said engagement, and means on said member for engagement with said key to prevent accidental rotation of said member.

8. In a brake head, end and intermediate lugs having a key passage therethrough, and a member for engagement with an associated shoe retaining key to maintain the same in assembly within said passage, said member being partially housed within one of said end lugs and pivoted thereto, whereby said member may be rotated into and out of said engagement, and means on said member comprising a flat surface on the pivoted end thereof for abutment with said key to prevent accidental rotation of said member.

9. In a brake head, end and intermediate lugs having a key passage therethrough, and a member adapted for overlapping relationship with an associated shoe retaining key to maintain the same in assembly within said passage, said member being partially housed within one of said end lugs and pivoted thereto, whereby said member may be rotated into and out of said relationship, and a plurality of angularly disposed flat surfaces on said member, one of said surfaces affording slidable abutment for said key during assembly and disassembly thereof and the other of said surfaces being adapted to abut said key to prevent accidental rotation of said member out of said overlapping relationship with said key.

ALFRED H. OELKERS.